United States Patent
Jalan et al.

(10) Patent No.: US 10,268,779 B2
(45) Date of Patent: Apr. 23, 2019

(54) SHARING SERVER CONVERSATIONAL CONTEXT BETWEEN MULTIPLE COGNITIVE ENGINES

(71) Applicant: INTERNATIONAL BUSINESS MACHINES CORPORATION, Armonk, NY (US)

(72) Inventors: Anu Jalan, Bangalore (IN); Naveen Kumar T, Coimbatore (IN); Priya Kannan, Bangalore (IN); Shashank M S, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/672,424

(22) Filed: Aug. 9, 2017

(65) Prior Publication Data
US 2019/0050496 A1 Feb. 14, 2019

(51) Int. Cl.
*G06F 17/27* (2006.01)
*G06F 17/30* (2006.01)
(Continued)

(52) U.S. Cl.
CPC ........ *G06F 17/30976* (2013.01); *G06F 9/453* (2018.02); *G06F 13/4208* (2013.01); *G06F 17/30684* (2013.01)

(58) Field of Classification Search
CPC ........... G06F 13/4208; G06F 17/30516; G06F 17/30539; G06F 17/30601; G06F 17/30876; G06F 17/30893; G06F 17/30958; G06F 17/30401; G06F 17/30734; G06F 17/278; G06F 17/277; G06N 5/022; G06N 5/02; G06N 5/04; G06N 99/005; G06Q 30/0241;
(Continued)

(56) References Cited

U.S. PATENT DOCUMENTS

| 8,250,192 B2 | 8/2012 | Bowerman |
| 8,831,520 B2 | 9/2014 | Demessie et al. |

(Continued)

OTHER PUBLICATIONS

Mell et al., "The NIST Definition of Cloud Computing," U.S. Department of Commerce, National Institute of Standards and Technology, Sep. 2011, p. 1-7, Special Publication 800-145.
(Continued)

*Primary Examiner* — Vijay B Chawan
(74) *Attorney, Agent, or Firm* — Michael O'Keefe (57) ABSTRACT

A method, computer system, and computer program product for determining a server conversational state in an interactive dialog between a server and an administrator is provided. The embodiment may include receiving a query statement from a user. The embodiment may also include updating a context map to reflect a context of the received query statement. The embodiment may further include transmitting a request to one or more cognitive engines capable of resolving the received query statement. The embodiment may also include processing the transmitted request in each of the one or more cognitive engines. The embodiment may further include updating the context map with a resolution operation performed by the one or more cognitive engines. The embodiment may also include displaying a response to the user.

20 Claims, 7 Drawing Sheets

(51) Int. Cl.
*G06F 9/451* (2018.01)
*G06F 13/42* (2006.01)

(58) Field of Classification Search
CPC ........... G06Q 30/0269; G06Q 30/0277; G06Q 10/00; G10L 13/00; G10L 15/00
USPC .................................... 704/270, 275, 270.1
See application file for complete search history.

(56) References Cited

U.S. PATENT DOCUMENTS

| | | | |
|---|---|---|---|
| 2015/0356133 A1 | 12/2015 | Castellano | |
| 2015/0356135 A1* | 12/2015 | Sanchez | G06F 17/30401 707/763 |
| 2015/0356150 A1* | 12/2015 | Sanchez | H04W 4/025 707/740 |
| 2015/0356405 A1* | 12/2015 | Sanchez | G06N 5/02 706/12 |
| 2015/0356423 A1 | 12/2015 | Sanchez et al. | |
| 2015/0356425 A1* | 12/2015 | Sanchez | G06N 5/022 706/12 |
| 2015/0356428 A1* | 12/2015 | Sanchez | G06N 5/04 706/12 |
| 2015/0356430 A1 | 12/2015 | Saxena et al. | |
| 2015/0356437 A1* | 12/2015 | Sanchez | H04W 4/025 706/55 |
| 2015/0356440 A1* | 12/2015 | Faith | H04W 4/025 706/55 |
| 2015/0356626 A1* | 12/2015 | Chawla | H04W 4/025 705/14.66 |
| 2016/0219048 A1 | 7/2016 | Porras et al. | |
| 2017/0330092 A1 | 11/2017 | Lindsley et al. | |

OTHER PUBLICATIONS

Disclosed Anonymously, "Framework for cognitive server administration through natural language interaction", An IP.com Prior Art Database Technical Disclosure, IP.com No. IPCOM000248430D, IP.com Electronic Publication Date: Nov. 29, 2016, pp. 1-6.
IBM: List of IBM Patents or Patent Applications Treated As Related (Appendix P), Mar. 20, 2018, pp. 1-2.
U.S. Appl. No. 15/843,927, filed Dec. 15, 2017.

* cited by examiner

SHARING SERVER CONVERSATIONAL CONTEXT BETWEEN MULTIPLE COGNITIVE ENGINES

BACKGROUND

The present invention relates, generally, to the field of computing, and more particularly to natural language processing.

Natural language processing may relate to a field within computer science dealing with the analysis of natural language text by a computer. Natural language processing may have applications in various categories, such as syntax, semantics, discourse, and speech. Various applications within the mentioned categories include text-to-speech, discourse analysis, relationship extraction, natural language generation, sentiment analysis, parsing, word segmentation, terminology extraction, machine translation, and summarization.

SUMMARY

According to one embodiment, a method, computer system, and computer program product for determining a server conversational state in an interactive dialog between a server and an administrator is provided. The embodiment may include receiving a query statement from a user. The embodiment may also include updating a context map to reflect a context of the received query statement. The embodiment may further include transmitting a request to one or more cognitive engines capable of resolving the received query statement. The embodiment may also include processing the transmitted request in each of the one or more cognitive engines. The embodiment may further include updating the context map with a resolution operation performed by the one or more cognitive engines. The embodiment may also include displaying a response to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to natural language processing. The following described exemplary embodiments provide a system, method, and program product to, among other things, allow for server administration by analyzing natural language inputs in a server administration graphical user interface. Therefore, the present embodiment has the capacity to improve the technical field of natural language processing by integrating cognitive engines that allow for the efficient understanding of query context.

As previously described, natural language processing may relate to a field within computer science dealing with the analysis of natural language text by a computer. Natural language processing may have applications in various categories, such as syntax, semantics, discourse, and speech. Various applications within the mentioned categories include text-to-speech, discourse analysis, relationship extraction, natural language generation, sentiment analysis, parsing, word segmentation, terminology extraction, machine translation, and summarization.

To utilize natural language processing in server administration, a system may be required to support multiple server administration user cases, such as provisioning, monitoring, operations, optimization, problem resolution, and governance. When natural language is utilized in one or more of the use cases for server administration, context may be missing based on the wording utilized by a user inputting a query statement. The use cases can be implemented by multiple systems or cognitive engines which may be co-located or distributed. Since infrastructure management may be an involved task, implementation of the use cases for a specific platform can be tasked to one or more cognitive engines. In a conversational context, predicting the flow of a conversation or questions to be posed to an administrator may not be possible. As such, it may be advantageous to, among other things, implement a server administration system that leverages one or more cognitive engines to analyze a user-entered query statement to provide adequate context to the question or conversational flow for the system to properly execute the query.

According to one embodiment, based on the question or conversational flow, the system may require routing a part of the question to a cognitive engine that can predict the conversational or question flow. In the embodiment, the cognitive engine may require the context of the conversation that has transpired thus far to correctly address the instant query. Standing alone, the query may not completely convey the context so the system may be required to lookup the cognitive engine context to determine precisely the information sought. A cognitive engine may be an analytics engine capable of providing context to one or more areas of a user-entered query statement.

Infrastructure interactive management through natural language may involve a back-end that supports multiple categories of infrastructure management use cases. The back-end may be a collection of cognitive engines that are co-located or distributed geographically. The system may be required to understand various contexts surrounding the query, such as the appropriate cognitive engine to route a question, aggregating knowledge from the cognitive engine response and rerouting accordingly, and assist a cognitive engine to appropriately respond to the question. Furthermore, various types of context may be maintained, such as infrastructure context, use case categories (e.g., provisioning, monitoring, and problem resolution), entity context (e.g., which server, partition, management console, or adapter is being referred to), operation context (e.g., determining whether a create, deploy, or activate operation has been previously executed prior to a user encountering an error), and success/error context (e.g., success or error from an operation as recorded by the management interface). Additionally, a map implementation may hold the context, and be used to share the context between cognitive engines. In the cognitive engine, a context resolution module may be implemented that cognitively resolves and reconstructs the context from the context map.

The in-memory context may be maintained in a JavaScript Object Notation (JSON) format that may be shared across the cognitive engines. The JSON may also store the context IDs in a database respective to the current conversation. The context of the conversation may be stored against the context IDs in the database as a strong or an entry in natural language. The information from the context ID can be routed to the cognitive application program interfaces (APIs), such as retrieving and ranking to further discover the next best possible action or a resolution to a problem based on the context.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to utilize one or more cognitive engines to analyze a user-entered query statement directed to one or more user case categories so adequate context for the query statement may be provided.

Figure 1:
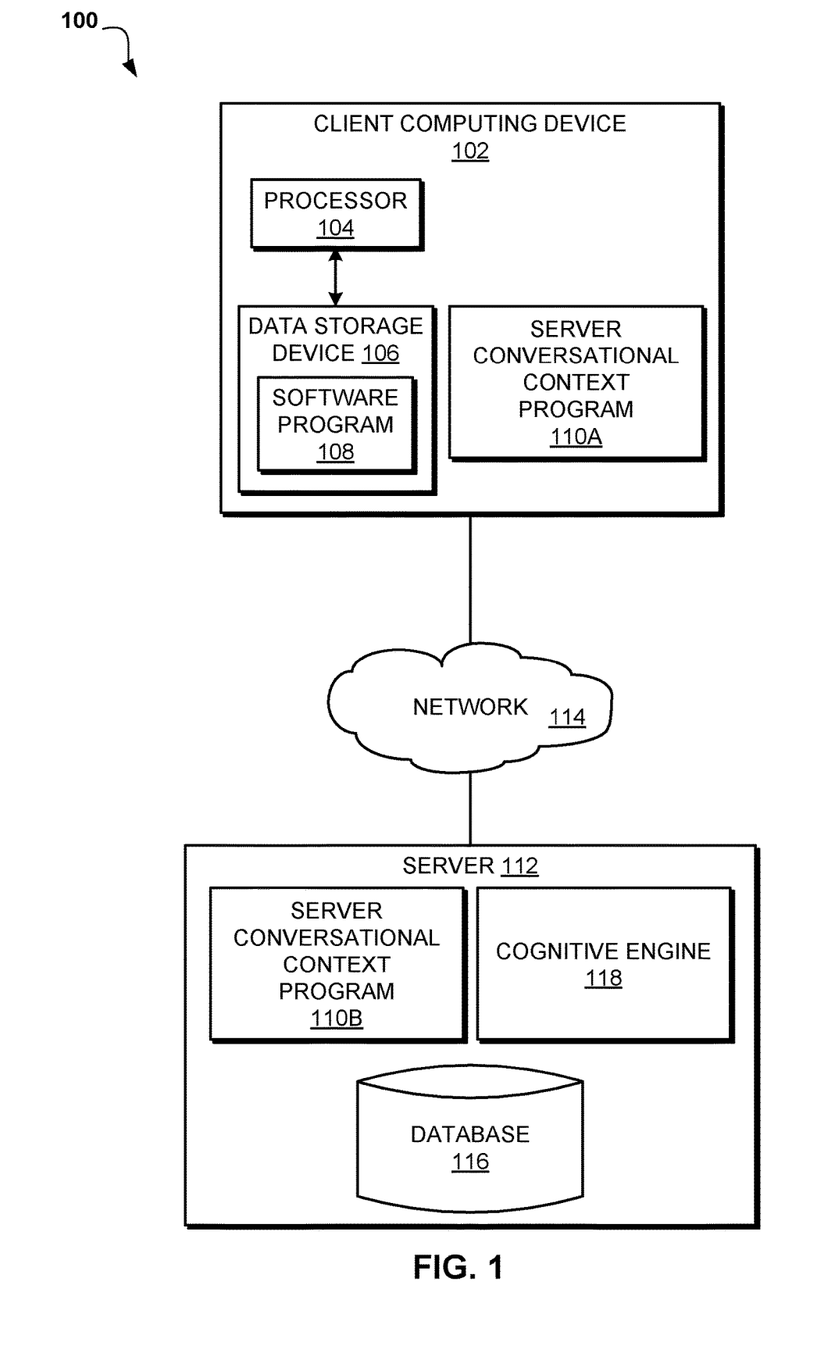
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a server conversational context program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a server conversational context program 110B, a cognitive engine 118, and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The cognitive engine 118 may be an analytics engine capable of providing context to one or more areas of a user-entered query statement. The cognitive engine 118 is explained in further detail in FIG. 2.

According to the present embodiment, the server conversational context program 110A, 110B may be a program capable of analyzing a user-entered query statement and leveraging one or more cognitive engines 118 to determine a context for the query statement to allow for proper execution of a server administration task. The collaborative moment method is explained in further detail below with respect to FIGS. 3A-3B.

Figure 2:
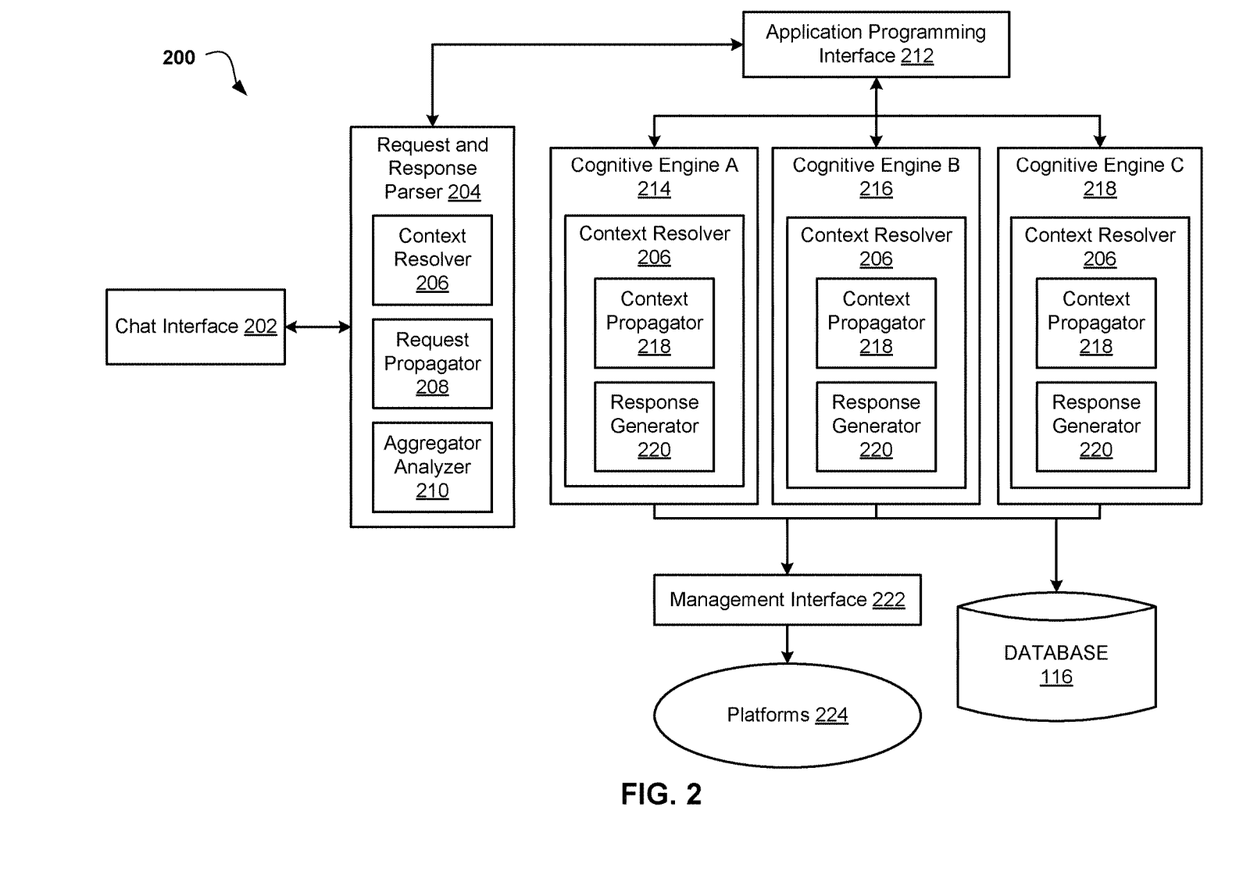
FIG. 2 is a component work flow block diagram according to at least one embodiment.

FIG. 2 is a component work flow block diagram 200 according to at least one embodiment. The work flow block diagram 200 depicts a chat interface 202 which is capable of interacting with a request and response parser 204. The chat interface 202 may be a communication program, such as software program 108, capable of sending and receiving messages from a sender to a recipient. The chat interface 202 may allow a user to enter in a natural language query statement for submission to the request and response parser 204. For example, a user may enter a natural language query statement requesting the name of each server connected to a management console system. In at least one embodiment, the chat interface 202 may be launched through management interface 222.

The request and response parser 204 may be capable of analyzing the user-entered query statement for relevant contextual information. The request and response parser 204 may include a context resolver 206, a request propagator 208, and an aggregator analyzer 210. The context resolver 206 may be a program capable of analyzing previous user-entered query statements and identifying specific actions taken by the user after the query statement was responded to. For example, the context resolver 206 may analyze a query statement asking for information about a management console system and determine, when the system is at a specific performance level, the user increases space on the system to allow for increased performance. Taking the determined context from the context resolver 206, the request propagator 208 may be a capable of propagating specific requests to an appropriate cognitive engine 118 responsible for one or more relevant areas, such as cognitive engine A 214, cognitive engine B 216, and cognitive engine C 218. The aggregator analyzer 210 may be a program capable of analyzing the responses from each cognitive engine to which a request was transmitted by the request propagator 208 and compiling each response to an aggregated response for presentation to the user.

The application programming interface (API) 212 is a software development tool that includes subroutine definitions and protocols utilized by developers when building a software application. API 212 may be a service, such as IBM Watson® (Watson and all Watson-based trademarks and logos are trademarks or registered trademarks of International Business Machines Corporation and/or its affiliates). API 212 may include multiple APIs 212 capable of tuning or training the one or more cognitive engines 118.

As previously described, the cognitive engine 118 may be an analytics engine capable of providing context to one or more areas of a user-entered query statement. Cognitive engine 118 may include one or more cognitive engines, such as cognitive engine A 214, cognitive engine B 216, and cognitive engine C 218, which each may be capable of identifying contextual information specific to different areas. Each cognitive engine 214-218 may include a context resolver 206.

The context resolver 206 may be a program capable of receiving a request from the request propagator 208 within the request and response parser 204 via API 212, analyzing the request, determining a response, and returning the response to the request and response parser 204 for processing by the aggregator analyzer 210. The context resolver 206 may utilize a context propagator 218 and a response generator 220 to internally search the received request from the request and response parser 204 and transmit a response to the received request back to the request and response parser 204, respectively.

The management interface 222 may be a known software program that allows a user to provide server administration services. Additionally, platforms 224 may be known programs capable of performing the commands for server administration as provided by the user.

The database 116 may be a data repository capable of storing context information related to server administration and searchable by the cognitive engine 118 and the server conversational context program 110A, 110B.

Figure 3A:
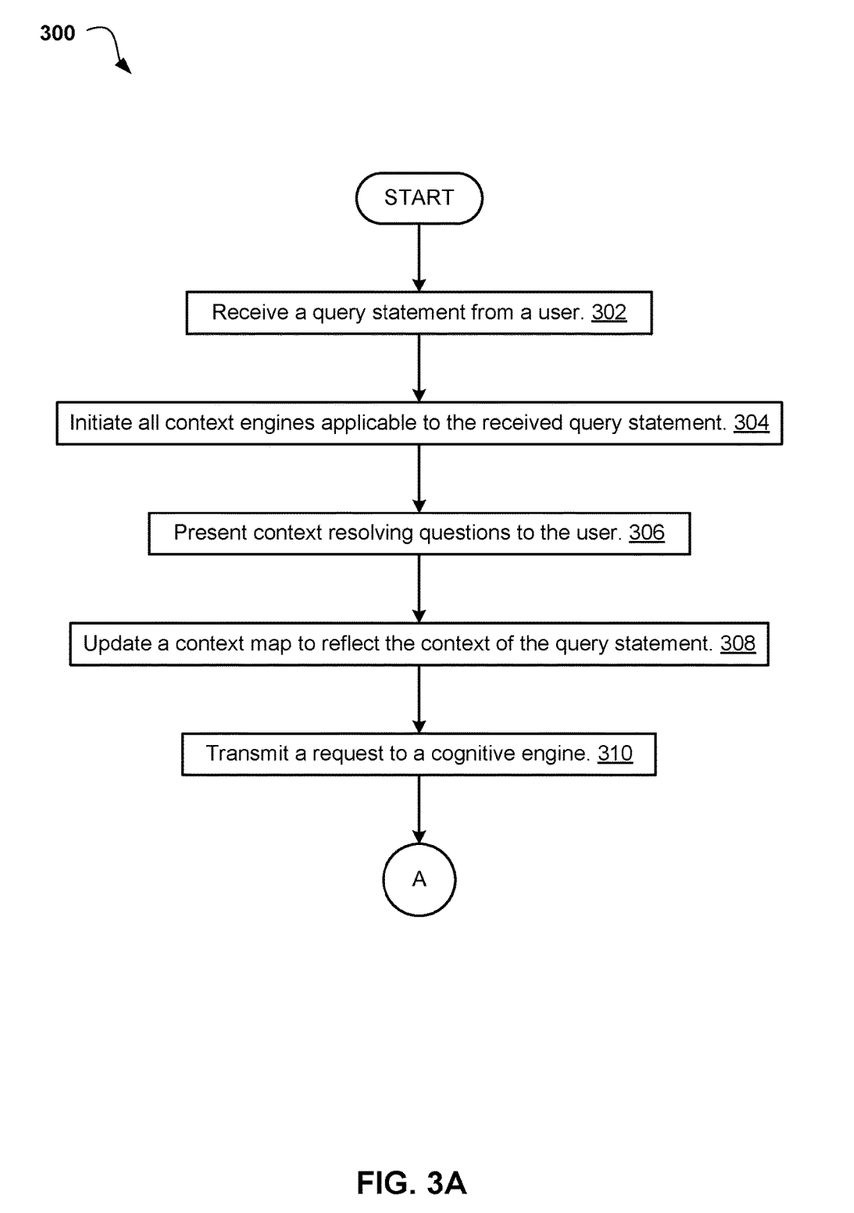
FIGS. 3A and 3B are an operational flowchart illustrating a server conversational context process according to at least one embodiment.

FIGS. 3A and 3B are an operational flowchart illustrating a server conversational context process according to at least one embodiment. In FIG. 3A, at 302, the server conversational context program 110A, 110B receives a query statement from a user. While utilizing the server conversational context program 110A, 110B, the user may enter a natural language query statement into a graphical user interface associated with the chat interface 202. For example, the user may enter the text "Provision a virtual machine" into a text dialog box in the chat interface 202 when the user wishes to set up an application using the virtual machine. Additionally, as previously described, the chat interface 202 may be launched through the management interface 222.

Then, at 304, the server conversational context program 110A, 110B initiates all context engines applicable the received query statement. Since the server conversational context program 110A, 110B is capable of connecting to one or more cognitive engines 118, the server conversational context program 110A, 110B may determine which cognitive engines 118 are capable of processing to the user-entered query statement and initiate all applicable cognitive engines 118. For example, if three cognitive engine A 214, cognitive engine B 216, and cognitive engine C 218 are capable of handling provisioning, monitoring, and operations, respectively, then the server conversational context program 110A, 110B may only initiate cognitive engine A 214 when the received user query statement is "Provision a virtual machine". Additionally, the server conversational context program 110A, 110B may store information relating to areas of specialization for each cognitive engine 118 in a data repository, such as database 116. In at least one embodiment, the server conversational context program 110A, 110B may be capable of determining the appropriate context area to which the user-entered query statement relates based on a natural language analysis of the text within the query statement. For example, a natural language analysis of the query statement "Provision a virtual machine" may determine the query statement relates to provisioning.

Next, at 306, the server conversational context program 110A, 110B presents context resolving questions to the user. If the query statement requires clarifying information, the server conversational context program 110A, 110B may present context resolving questions to the user to clarify any present ambiguities that may impede the server conversational context program 110A, 110B from transmitting the request to or identifying the appropriate cognitive engine 118. For example, if the user-entered query statement is "I intend to run a server", the server conversational context program 110A, 110B may present follow up questions, such as "Do you want to provision a virtual machine?" or "Do you want to provision an application server?", to the user through the graphical user interface of the chat interface 202 to resolve any context ambiguities that may be present after a natural language analysis of the user-entered query statement.

Then, at 308, the server conversational context program 110A, 110B updates a context map to reflect the context of the query statement. As previously described, various types of concepts may be maintained by the server conversational context program 110A, 110B. Each context may be stored within a map implementation, or context map, shared between the cognitive engines 118 and maintained in a JSON format. Once the server conversational context program 110A, 110B identifies the context or contexts associated with the user-entered query statement, the server conversational context program 110A, 110B may update the context map to reflect the identified context or contexts.

Next, at 310, the server conversational context program 110A, 110B transmits a request to a cognitive engine. Once the contextual information is created in the context map and is available as a request as an extensible markup language (XML) file, the server conversational context program 110A, 110B may transmit the request to an appropriate cognitive engine 118 for resolution. In at least one embodiment, the server conversational context program 110A, 110B may generate a call to be routed through one or more APIs 212, such as IBM Watson® National Language Classification API, IBM Watson® Language API, and IBM Watson® Retrieve and Rank API. For example, in the previously described example, API 212 may transmit a request received from the request and response parser 204 to cognitive engine A 214 that is related to provisioning a system. Additionally, when transmitting the request to the cognitive engine 118, the server conversational context program 110A, 110B may also transmit or share access to the context with the cognitive engine 118.

Figure 3B:
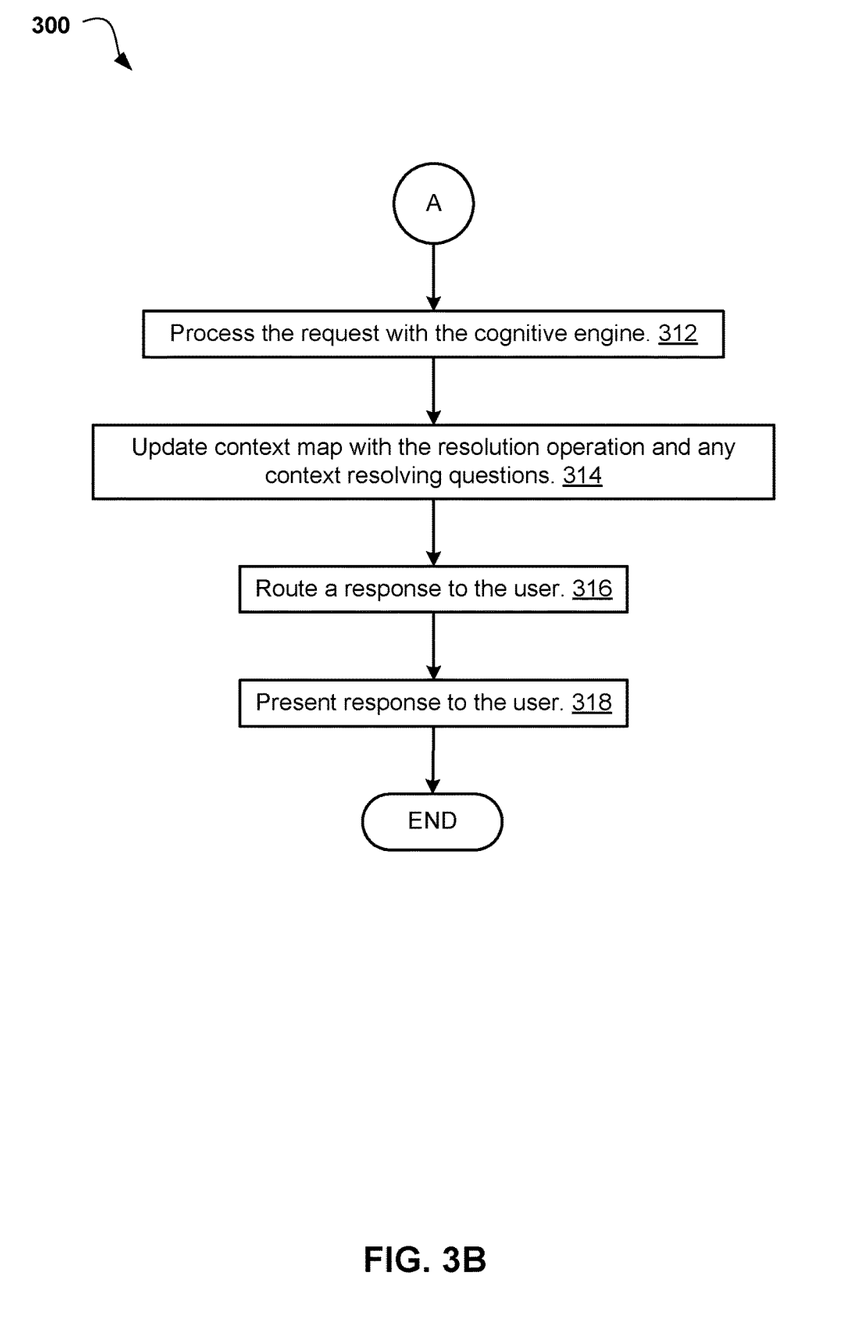

Referring now to FIG. 3B, at 312, the server conversational context program 110A, 110B processes the received request using the cognitive engine 118. When the appropriate cognitive engine 118 receives the request, the cognitive engine 118 may analyze the request with the accompanied context to determine the history associated with the request and then perform the resolution operation needed to satisfy the request. For example, if the user is asking the server conversational context program 110A, 110B to provision a server, the server conversational context program 110A, 110B may determine the user's access level and the user's location to determine which server should be provisioned and, then, actually perform a provisioning of the appropriate server as determined by the cognitive engine 118.

Next, at 314, the server conversational context program 110A, 110B updates the context map. Once the server conversational context program 110A, 110B has processed the request and performed the resolution operation, the server conversational context program 110A, 110B may update the context map with details associated with the resolution operation. For example, if the user secured a network and set up a storage network on a server, such as platforms 224 the server conversational context program 110A, 110B may update the context map with the previously taken actions by the user since the latest update to the context map was made. Additionally, if the server conversational context program 110A, 110B presents any context resolving questions to the user before performing the resolution operation in step 312, the server conversational context program 110A, 110B may include the context resolving questions in the context map as well as the performed resolution operations to provide a complete and accurate context depiction in the context map.

Then, at 316, the server conversational context program 110A, 110B routes a response. Once the server conversational context program 110A, 110B has performed the resolution operation and updated the context map, the server conversational context program 110A, 110B may route a response from the cognitive engine 118 back to the user through the request and response parser 204. If the request and response parser 204 utilized multiple requests to different cognitive engines 118, such as cognitive engine A 214, cognitive engine B 216, and cognitive engine C 218, the server conversational context program 110A, 110B utilizing the aggregator analyzer 210 may aggregate the received responses from the cognitive engines 118 to generate a complete response to the user's query statement. For example, if when resolving the context of the user query statement the request and response parser 204 transmitted a request to cognitive engine A 214 and a separate request to cognitive engine B 216, the request and response parser 204 may aggregate the individual responses from cognitive engine A 214 and cognitive engine B 216 once both are received to a complete response may be provided to the user.

Next, at 318, the server conversational context program 110A, 110B presents the response to the user. Once the request and response parser 204 has received and, if necessary, aggregated the response from the one or more cognitive engines 118, the response may be presented to the user through the chat interface 202. The response may be displayed to the user through the graphical user interface, and may allow the user to provide a follow up query statement based on the response. In at least one embodiment, if the user submits a follow up question related to the returned response, the server conversational context process 300 may return to step 306 to present context resolving question to the user and continue through the method until a response is again presented to the user.

It may be appreciated that FIGS. 3A-3B provide only an illustration of one implementation and do not imply any limitations with regard to how different embodiments may be implemented. Many modifications to the depicted environments may be made based on design and implementation requirements.

Figure 4:
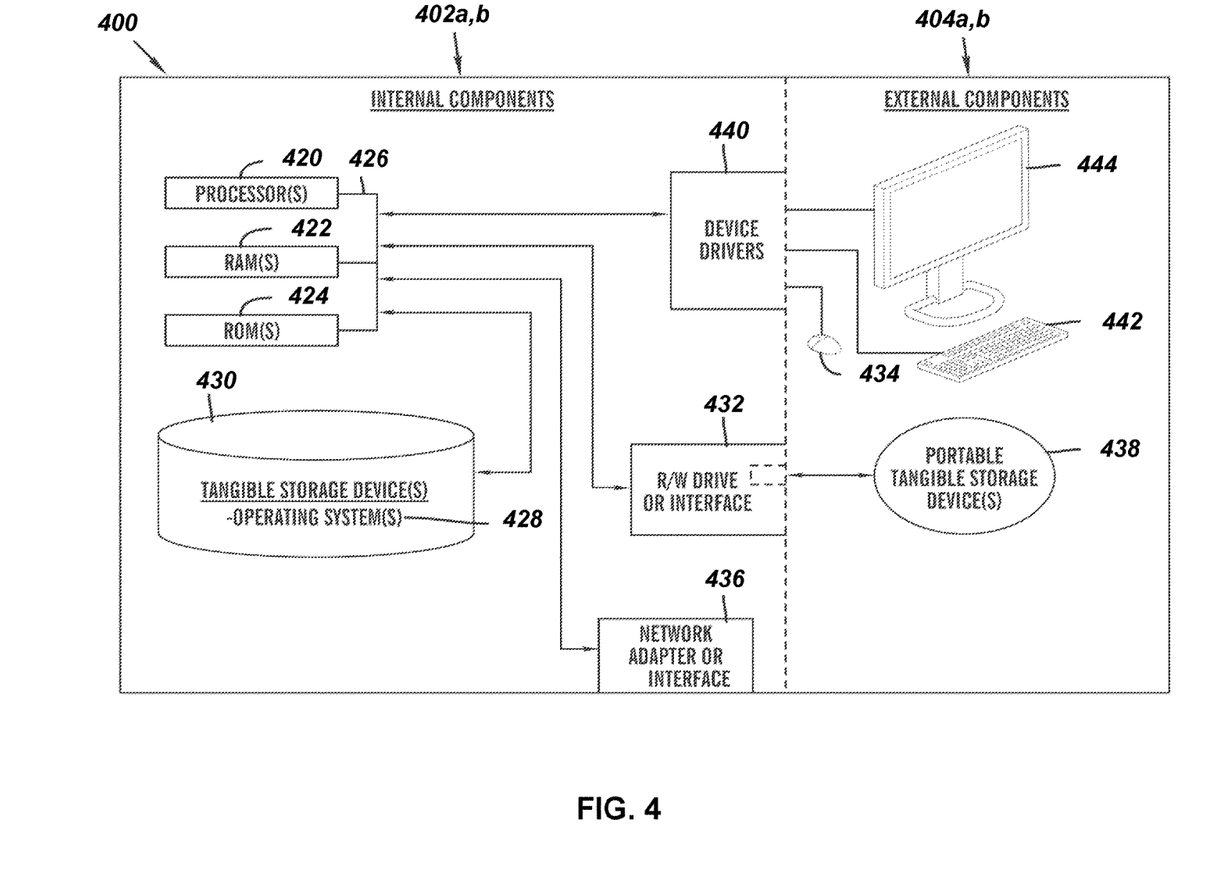
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402a,b and external components 404a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the server conversational context program 110A in the client computing device 102 and the server conversational context program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the server conversational context program 110A, 110B, can be stored on one or more of the respective portable computer-readable tangible storage devices 438, read via the respective R/W drive or interface 432, and loaded into the respective hard drive 430.

Each set of internal components 402a,b also includes network adapters or interfaces 436 such as a TCP/IP adapter cards, wireless Wi-Fi interface cards, or 3G or 4G wireless interface cards or other wired or wireless communication links. The software program 108 and the server conversational context program 110A in the client computing device 102 and the server conversational context program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the server conversational context program 110A in the client computing device 102 and the server conversational context program 110B in the server 112 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
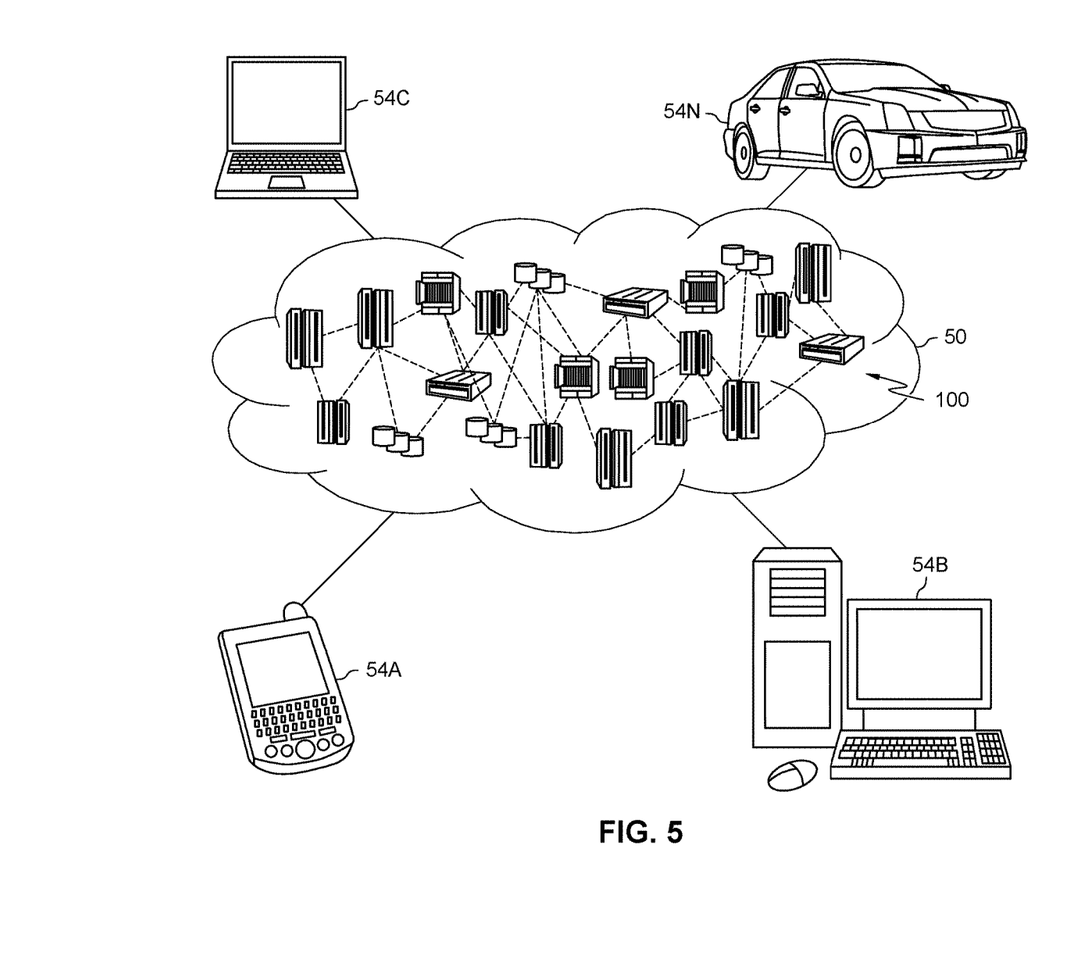
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
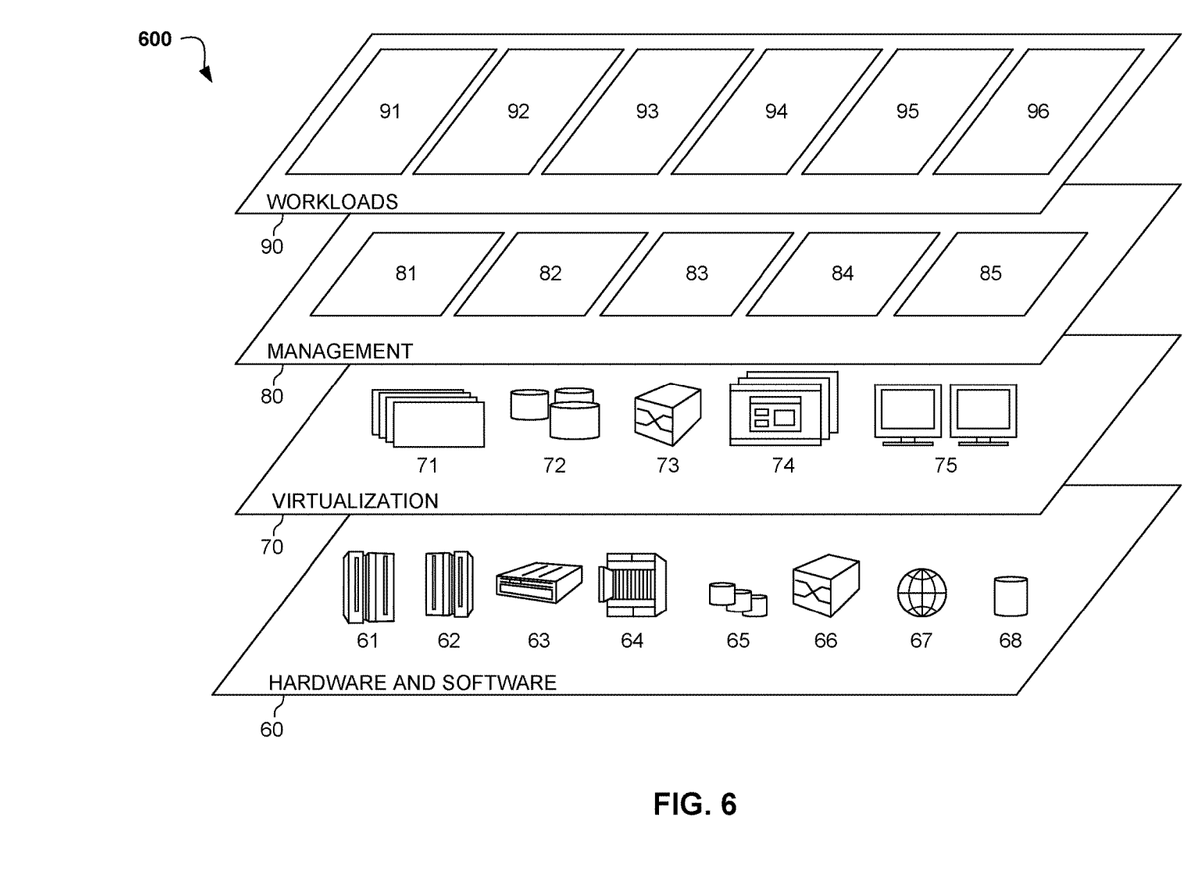
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and server conversational context 96. Server conversational context 96 may relate to analyzing user query statements for a context associated with the query statement, transmitting the query request to one or more cognitive engines associated with the context, aggregating returned responses from the one or more cognitive engines, and presenting the aggregated response to the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for determining a server conversational state in an interactive dialog between a server and an administrator, the method comprising:
    receiving, by a processor, a natural language query statement from a user through a chat interface launched by a management interface;
    updating a context map to reflect a context of the received query statement, and wherein the context is maintained in memory in a JavaScript Object Notation format shared across each cognitive engine;
    transmitting a request to one or more cognitive engines capable of resolving the received query statement, wherein the request is transmitted through an application programming interface as an extensible markup language file;
    processing the transmitted request in each of the one or more cognitive engines;
    updating the context map with a resolution operation performed by the one or more cognitive engines, wherein updating the context map comprises reconstructing the context from the context map; and
    displaying a response to the user.

2. The method of claim 1, further comprising:
    determining one or more cognitive engines associated with the received query statement; and
    initiating the one or more cognitive engines.

3. The method of claim 1, further comprising:
    presenting one or more context resolving questions to the user; and
    receiving a context resolving response from the user based on the one or more context resolving questions.

4. The method of claim 1, further comprising:
    receiving a request response from each of the one or more cognitive engines; and
    aggregating each request response to generate the response.

5. The method of claim 2, wherein a request and response parser analyzes the received query statement for a plurality of contextual information used to determine the one or more cognitive engines.

6. The method of claim 1, wherein updating the context map comprises saving the updated context map to a database as an extensible markup language (XML) file or a JavaScript Object Notation format.

7. The method of claim 1, wherein the response is displayed to the user on a chat interface of a server administration platform.

8. A computer system for determining a server conversational state in an interactive dialog between a server and an administrator, the computer system comprising:
    one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
    receiving, by a processor, a natural language query statement from a user through a chat interface launched by a management interface;
    updating a context map to reflect a context of the received query statement, and wherein the context is maintained in memory in a JavaScript Object Notation format shared across each co-located cognitive engine;
    transmitting a request to one or more cognitive engines capable of resolving the received query statement, wherein the request is transmitted through an application programming interface as an extensible markup language file;
processing the transmitted request in each of the one or more cognitive engines;
updating the context map with a resolution operation performed by the one or more cognitive engines, wherein updating the context map comprises reconstructing the context from the context map; and
displaying a response to the user.

9. The computer system of claim 8, further comprising:
determining one or more cognitive engines associated with the received query statement; and
initiating the one or more cognitive engines.

10. The computer system of claim 8, further comprising:
presenting one or more context resolving questions to the user; and
receiving a context resolving response from the user based on the one or more context resolving questions.

11. The computer system of claim 8, further comprising:
receiving a request response from each of the one or more cognitive engines; and
aggregating each request response to generate the response.

12. The computer system of claim 9, wherein a request and response parser analyzes the received query statement for a plurality of contextual information used to determine the one or more cognitive engines.

13. The computer system of claim 8, wherein updating the context map comprises saving the updated context map to a database as an extensible markup language (XML) file or a JavaScript Object Notation format.

14. The computer system of claim 8, wherein the response is displayed to the user on a chat interface of a server administration platform.

15. A computer program product for determining a server conversational state in an interactive dialog between a server and an administrator, the computer program product comprising:
one or more computer-readable tangible storage media and program instructions stored on at least one of the one or more tangible storage media, the program instructions executable by a processor of a computer to perform a method, the method comprising:
receiving a natural language query statement from a user through a chat interface launched by a management interface;
updating a context map to reflect a context of the received query statement, and wherein the context is maintained in memory in a JavaScript Object Notation format shared across each cognitive engine;
transmitting a request to one or more cognitive engines capable of resolving the received query statement, wherein the request is transmitted through an application programming interface as an extensible markup language file;
processing the transmitted request in each of the one or more cognitive engines;
updating the context map with a resolution operation performed by the one or more cognitive engines, wherein updating the context map comprises reconstructing the context from the context map; and
displaying a response to the user.

16. The computer program product of claim 15, further comprising:
determining one or more cognitive engines associated with the received query statement; and
initiating the one or more cognitive engines.

17. The computer program product of claim 15, further comprising:
presenting one or more context resolving questions to the user; and
receiving a context resolving response from the user based on the one or more context resolving questions.

18. The computer program product of claim 15, further comprising:
receiving a request response from each of the one or more cognitive engines; and
aggregating each request response to generate the response.

19. The computer program product of claim 16, wherein a request and response parser analyzes the received query statement for a plurality of contextual information used to determine the one or more cognitive engines.

20. The computer program product of claim 15, wherein updating the context map comprises saving the updated context map to a database as an extensible markup language (XML) file or a JavaScript Object Notation format.

* * * * *